J. J. SLEPICKA.
STEERING WHEEL FOR AUTOMOBILES.
APPLICATION FILED APR. 8, 1908. RENEWED JAN. 28, 1911.
990,915.
Patented May 2, 1911.
3 SHEETS—SHEET 1.
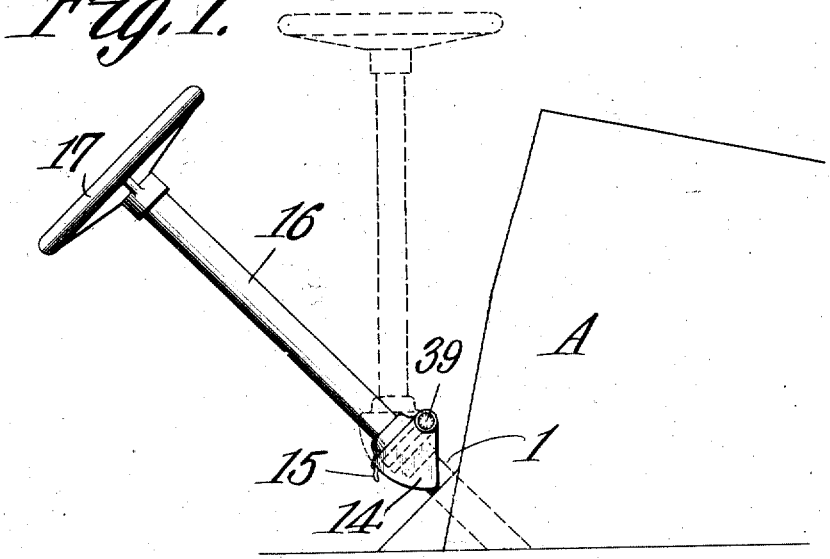
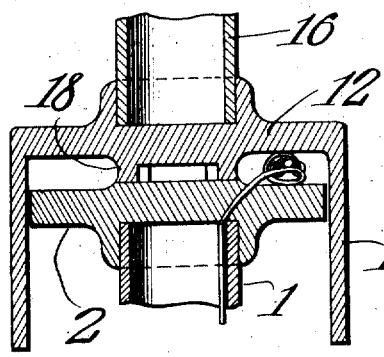
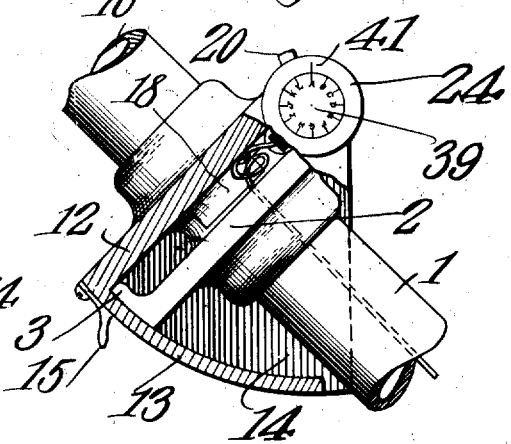
Witnesses
Inventor
John J. Slepicka.
By C A Snow & Co
Attorneys

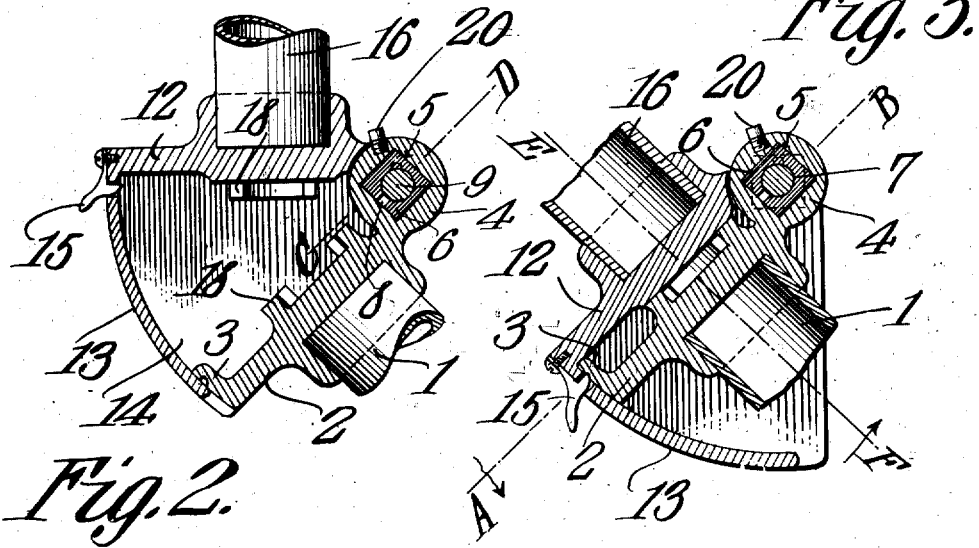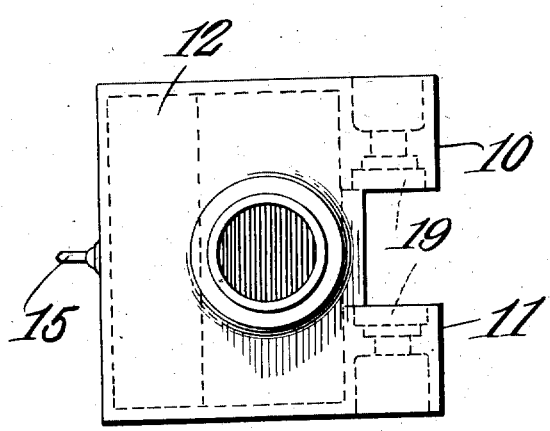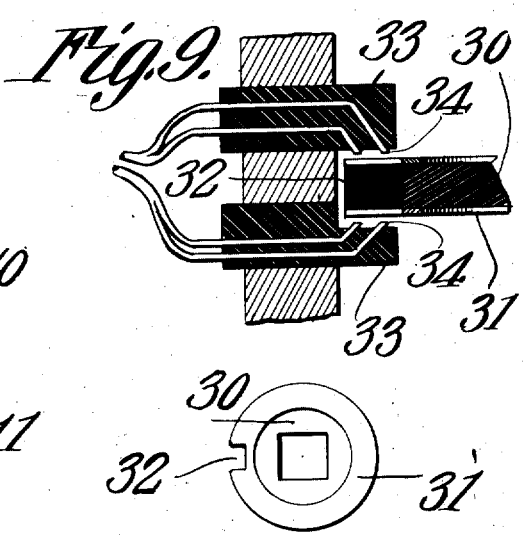

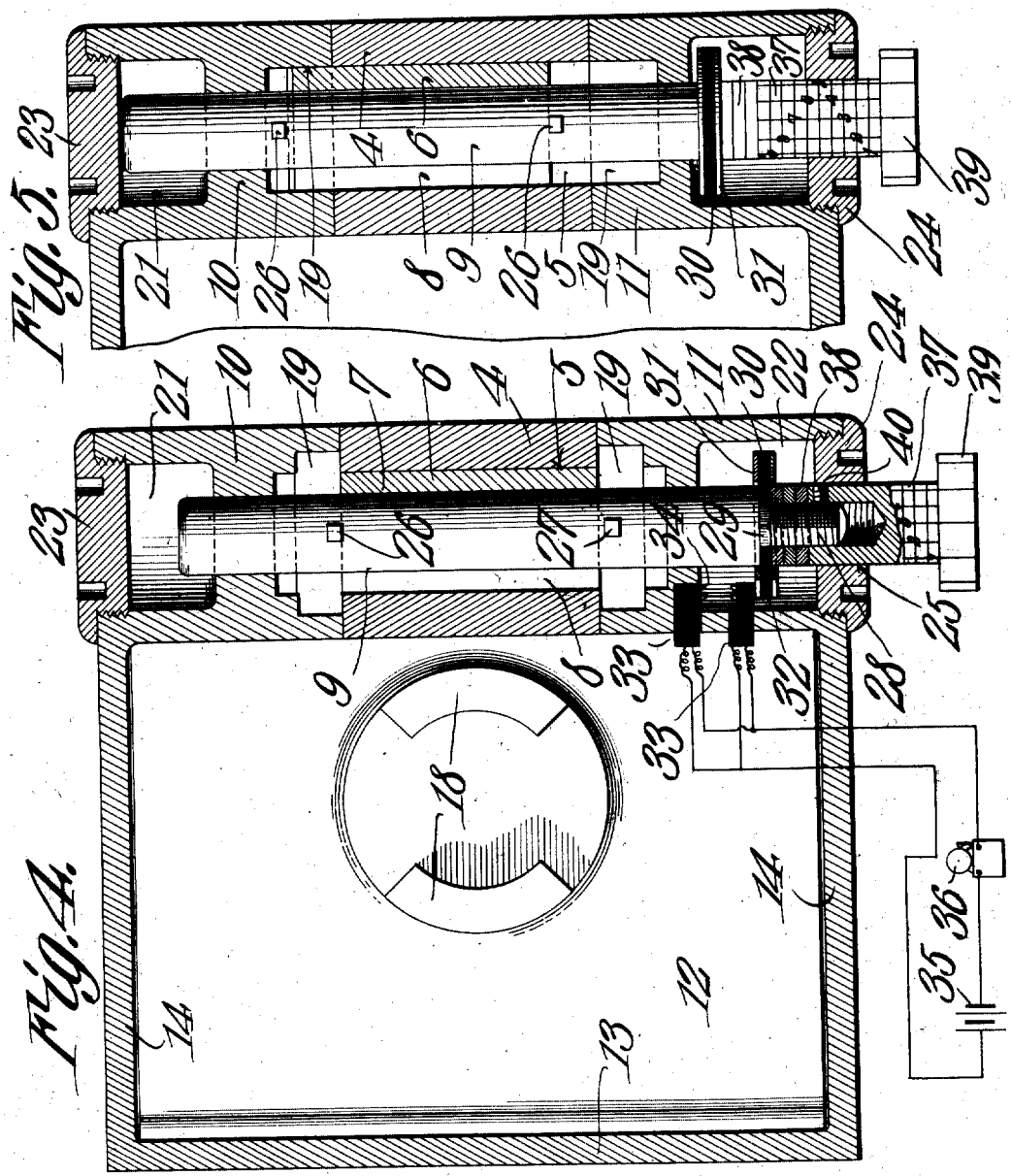

UNITED STATES PATENT OFFICE.

JOHN J. SLEPICKA, OF INDIANA HARBOR, INDIANA.

STEERING-WHEEL FOR AUTOMOBILES.

990,915.  Specification of Letters Patent.  Patented May 2, 1911.

Application filed April 8, 1908, Serial No. 425,939. Renewed January 28, 1911. Serial No. 605,292.

*To all whom it may concern:*

Be it known that I, JOHN J. SLEPICKA, a subject of the Emperor of Austria-Hungary, residing at Indiana Harbor, in the county of Lake and State of Indiana, have invented a new and useful Steering-Wheel for Automobiles, of which the following is a specification.

This invention relates to steering wheels for automobiles and similar vehicles.

It is a well known fact that steering wheels of ordinary construction greatly interfere with the movements of the chauffeur in entering or leaving the machine because the wheels are carried ordinarily at the upper ends of inclined shafts. The ordinary steering wheels are also objectionable because when a machine is left without an attendant unauthorized persons can enter the machine and guide it without any great difficulty.

One of the objects of the present invention is to provide a shaft for the steering wheel which is capable of being swung into an upright position when not in use so as to offer no obstruction to the movements of persons occupying the front seat of the machine.

Another object is to provide a combination lock for fastening the shiftable section of the shaft when in inoperative position so that it can not be lowered for the purpose of steering the machine except by some person acquainted with the combination of the lock.

Another object is to provide a lock of this character with which an alarm is combined so that unless the mechanism of the lock is properly actuated the alarm will be sounded and thus due warning given of the fact.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a steering shaft embodying the present improvements, the movable section of the shaft being shown by dotted lines in raised or inoperative position. Fig. 2 is a central vertical section through the connections between the shaft members, the parts being shown in the position assumed by them when the shiftable section is in raised position. Fig. 3 is a view similar to Fig. 2 but showing the two shaft sections in alinement. Fig. 4 is an enlarged section on line A—B, Fig. 3 and showing the alarm and its wire in diagram. Fig. 5 is an enlarged section on line C—D, Fig. 2. Fig. 6 is a section on line E—F, Fig. 3. Fig. 7 is an enlarged side elevation of the connection between the shaft members, the shield being shown in section. Fig. 8 is a plan view of the top member or hood of the connection. Fig. 9 is an enlarged section through the contacts and a portion of the circuit closer of the alarm mechanism. Fig. 10 is an end elevation of the circuit closer.

Referring to the figures by characters of reference, 1 designates the lower section of the steering shaft or pillar, the upper end of which is disposed preferably close to the rear end of the hood A of the machine. Secured to the upper end of this section 1 is a cap or plate 2 preferably rectangular in general outline and having an upstanding flange 3 along one edge which is notched for engagement with locking means. Extending from the opposite edge of plate 2 at the center thereof is a substantially cylindrical ear 4 having a rectangular opening 5 extending therethrough. Fitted within this opening is a rectangular sleeve 6 having a cylindrical bore 7. A longitudinal slot 8 is formed along the center of one face of the sleeve and throughout the length thereof and opens into the bore 7. This sleeve fits snugly within the opening 5 and is designed to slide longitudinally therein. The sleeve is of the same length as the opening 5 and is normally positioned with its ends flush with the ends of the ear 4.

Extending through the bore 7 and slidable longitudinally therein is a combined actuating and pivot pin or bolt 9 which projects beyond the ends of sleeve 6 and constitutes bearings for ears 10 and 11 formed upon one edge of an upper plate or foot 12 of the connecting device constituting the present invention. This upper plate has an arcuate flange 13 extending downward from one edge thereof and is also provided with side flanges 14 and said flanges bear close against the sides and the flange 3 of plate 2 so as to close the space between the two plates 2 and 12 irrespective of their relative positions. A spring catch 15 is carried by the plate 12 and extends through flange 13 and is designed, when the plates 2 and 12 are swung together, to engage the notched flange 3 and lock the parts together. The upper member 16 of the steering pillar or shaft is fastened to the plate 12 and carries the steering wheel 17. If desired, and in order to relieve the pivot pin of excessive transverse strain during the operation of steering the machine, interlocking projections 18 may be formed upon the inner or adjoining faces of plates 2 and 12 so that when said plates are swung together these projections will engage and hold the two plates positively against independent rotation about the axis of the section 1.

Each of the ears 10 and 11 has a rectangular socket 19 in its inner end which is normally out of register with the opening 5 and sleeve 6 as clearly indicated by dotted lines in Fig. 3. When, however, the plate 12 and section 16 are swung outwardly these sockets will be moved into register with the opening 5 so as to permit the sleeve 6 to be shifted longitudinally into either of the sockets and thus lock the plate 12 in raised position relatively to the plate 2. The upward movement of plate 12 and section 16 can be stopped as soon as the sockets are brought into register with openings 5, by providing a stop pin 20 upon ear 4 and in the path of the plate 12 as shown in Figs. 2 and 3.

The ears 10 and 11 are both provided with sockets 21 and 22, respectively, in their outer ends, the socket 21 being closed by means of a screw cap 23 while another screw cap 24 having a central opening 25 constitutes the closure for the socket 22. Lugs 26 and 27 extend radially from the pivot pin or bolt 9 and are spaced apart a distance slightly greater than the length of sleeve 6. It will be apparent, therefore, that the bolt 9 is capable of a sliding longitudinal movement in the direction of its length before one of the lugs is brought into contact with the sleeve. A threaded stem 28 projects from one end of the bolt 9 and the inner portion of this stem is angular as indicated at 29 and constitutes a seat or bearing for a disk 30 formed of fiber or other insulating material and having rings 31 of conducting material secured to opposite faces thereof. The disk and the two rings thereon constitute a circuit closer and a notch 32 is formed in the periphery thereof and is so proportioned as to slip over one of a pair of plugs 33 of insulating material. Arranged upon the inner or adjoining faces of these plugs are contacts 34 arranged in pairs, those of each pair being arranged in circuit with a battery 35 and a bell 36. The circuit closer is held fixedly upon the angular portion 29 of stem 28 by means of a knob 37 which is internally screw threaded and engages the stem. If desired, one or more washers 38 may be interposed between the knob and the circuit closer so as to hold the head 39 of the knob at any desired distance from the circuit closer. A set screw 40 may be utilized for holding the knob against rotation relatively to the stem. The knob has graduations extending therearound which can be designated by numerals or any other desired characters and the outer face of the head 39 is also preferably provided with graduations suitably indicated as by means of letters any one of which is designed to be moved into register with a mark 41 on the outer face of the cap 24. When the parts are positioned as shown in Fig. 4 the section 16 can be swung downward into alinement with the section 1 and as the axis of the two sections thus coincide it will be apparent that the machine can be properly steered by manipulating the wheel 17 in the usual manner. The catch 15 of course serves to lock the two sections in this relation. When it is desired to leave the machine and to lock the parts so that it can not be properly steered the operator pulls upward on catch 15 so as to release the plate 12 from plate 2 and then swings the section 16 upwardly until this movement is stopped by the pin 20. The sockets 19 will therefore be brought into register with the opening 5. The operator turns knob 37 until the proper character or graduation upon head 39 registers with the mark 41. The notch 32 will then be positioned directly opposite plugs 33 as shown in Figs. 4 and 9. By pushing inwardly on the knob until a desired graduation is brought flush with the outer face of cap 24 the circuit closer can be caused to assume a position between the plugs but spaced from all of the contacts 34. By then turning the knob the notch 32 can be removed from position between the plugs. The inward movement of the knob before mentioned produces a corresponding movement of the bolt 9 and the lug 27 will therefore push the sleeve 6 into socket 19 in ear 10 and the two plates 2 and 12 will therefore be secured in spaced relation as indicated in Fig. 2. When it is desired to swing the section 16 downward into normal position it is first necessary to turn the knob 37 until the notch 32 registers with the plugs 33, this position being indicated by a predetermined graduation upon the knob. The knob is then pulled outwardly so as to cause lug 26 to push sleeve 6 out of the ear 10. When the knob has been pulled outwardly a predetermined distance, indicated by one of the graduations thereon, the sleeve will be entirely disposed within ear 4 whereupon plate 12 can be swung downward onto the plate 2 and the parts locked together by means of catch 15. Obviously should the knob be manipulated by an inexperienced person or a person unacquainted with the combination of the lock any shifting of the knob inwardly or outwardly will bring closer 31 against the contacts and complete the circuit through bell 36 which will thus be sounded and give warning of the fact that the lock is being tampered with. Not only is it necessary to known the proper graduation upon the head 39 in order to prevent sounding of the alarm but it is also necessary to know the proper graduation upon the barrel portion of the knob 37 as otherwise it would be difficult to so position the sleeve 6 as to entirely remove it from the two sockets 19 and permit independent movement of plate 12. Should the parts be locked in elevated position as indicated by dotted lines in Fig. 1 and a downward pull be exerted upon the wheel 17 this would result in the walls of sockets 19 bearing downward on the projecting end of sleeve 6 and contracting it so that it will tightly clamp on the pin or bolt 9 and absolutely prevent its longitudinal movement within the sleeve.

What is claimed is:

1. A steering shaft or pillar for automobiles and the like comprising a relatively fixed section, a relatively movable section hingedly connected thereto, means for locking said section at an angle to the relatively fixed section, and an alarm under the control of said locking means.

2. A steering shaft or pillar for automobiles and the like comprising a relatively fixed section, a relatively movable section, means for locking said movable section at an angle to the relatively fixed section, an electrically operated alarm, and means carried by said locking means for establishing a circuit through the alarm.

3. A steering shaft or pillar for automobiles and the like comprising a relatively fixed member, a relatively movable member connected thereto and normally alining therewith a lock for securing said movable member at an angle to the relatively fixed member, an alarm, and means for causing the alarm to be sounded during the improper manipulation of the lock.

4. A steering shaft or pillar for automobiles and the like comprising a relatively fixed member, a relatively movable member hingedly connected thereto and normally alining therewith, means for locking said movable member at an angle to the other member, an electrically operated alarm, and means movable with the lock for closing a circuit to the alarm during other than a predetermined manipulation of the lock.

5. The combination with a relatively fixed member and a relatively movable member; of a longitudinally movable pivot bolt connecting said members, and contractible means actuated by the bolt for locking the members out of alinement, said means being disposed to be contracted by the movable member to bind upon the bolt.

6. The combination with a relatively fixed member and a relatively movable member; of a longitudinally movable pivot bolt connecting said members, an angular contractible sleeve mounted upon and disposed to be actuated by the bolt to lock the members out of alinement, said sleeve being disposed to be actuated by the movable member, an alarm, and means shiftable with the bolt for controlling the actuation of the alarm.

7. The combination with a relatively fixed member, a cap thereon, and an angular opening within the cap; of a relatively movable member, a foot carried thereby and embracing the apertured portion of the cap, there being sockets within said foot shiftable into register with the opening in the cap, a sleeve normally seated within said opening, and a pivot bolt connecting the cap and foot, said bolt constituting means for shifting the sleeve into either socket.

8. The combination with a cap having an angular opening therein, a foot extending across opposite ends of the opening and having sockets shiftable into register with the opening, a pivot bolt slidably mounted within and connecting the cap and foot, a sleeve upon the bolt, means upon the bolt for engaging and shifting the sleeve, and means carried by the bolt for indicating the relative position of the sleeve within the cap.

9. The combination with a cap having an angular opening therein, a foot extending across opposite ends of the opening and having sockets shiftable into register with the opening, a pivot bolt slidably mounted within and connecting the cap and foot, a sleeve thereon, means upon the bolt for engaging and shifting the sleeve, means carried by the bolt for indicating the relative position of the sleeve within the cap, a circuit closer carried by the bolt, contacts in the path thereof, and an alarm in circuit with said contacts, said circuit closer being shiftable axially and annularly relatively to the contacts.

10. The combination with a cap having an angular opening therein, a foot extending across opposite ends of the opening and having sockets shiftable into register with the opening, a pivot bolt slidably mounted within and connecting the cap and foot; a sleeve thereon, means upon the bolt for engaging and shifting the sleeve, means carried by the bolt for indicating the relative position of the sleeve within the cap, a circuit closer revoluble and slidable with the bolt, contacts projecting into the path of the closer, said closer being notched to pass the contacts when brought to a predetermined position, and an alarm in circuit with the contacts.

In testimony that I claim the foregoing as my own, I have hereto affixed my signature in the presence of two witnesses.

JOHN J. SLEPICKA.

Witnesses:
C. A. MARSHALL,
L. E. SINGER.